United States Patent [19]

Kofink

[11] 4,265,496
[45] May 5, 1981

[54] APPARATUS FOR LONG-TERM BEARING LUBRICATION

[75] Inventor: Wolfgang Kofink, Aichwald, Fed. Rep. of Germany

[73] Assignee: Robert Bosch GmbH, Stuttgart, Fed. Rep. of Germany

[21] Appl. No.: 5,489

[22] Filed: Jan. 22, 1979

[30] Foreign Application Priority Data

Mar. 1, 1978 [DE] Fed. Rep. of Germany ....... 2808698

[51] Int. Cl.³ .............................................. F16C 33/66
[52] U.S. Cl. ..................................... 308/122; 308/187
[58] Field of Search ................... 308/76, 78, 121, 122, 308/170, 187, 240

[56] References Cited

U.S. PATENT DOCUMENTS

| | | | |
|---|---|---|---|
| 3,951,476 | 4/1976 | Schulien et al. ................. | 308/187 X |
| 3,957,317 | 5/1976 | Silver .............................. | 308/121 X |
| 3,977,739 | 8/1976 | Moskowitz et al. ................. | 308/187 |

Primary Examiner—Frederick R. Schmidt
Attorney, Agent, or Firm—Frishauf, Holtz, Goodman & Woodward

[57] ABSTRACT

In order to improve the lubrication of relatively moving parts of machinery, in particular of bearings carrying rotating shafts, there is provided a lubricant reservoir adjacent to the bearing in which a movable transport member is located. The transport member may be, for example, a spring, one end of which is attached to the shaft rotating in the bearing so that the centrifugal force imparted to the spring causes its free end to enter into the lubricant reservoir whereupon, when the shaft is slowed down or stopped, the elasticity of the spring causes its return to a rest position, during which lubricant is positively displaced in the direction of the bearing. The motion of the transport member may also be effected by other external influences, for example by a magnetic field.

9 Claims, 1 Drawing Figure

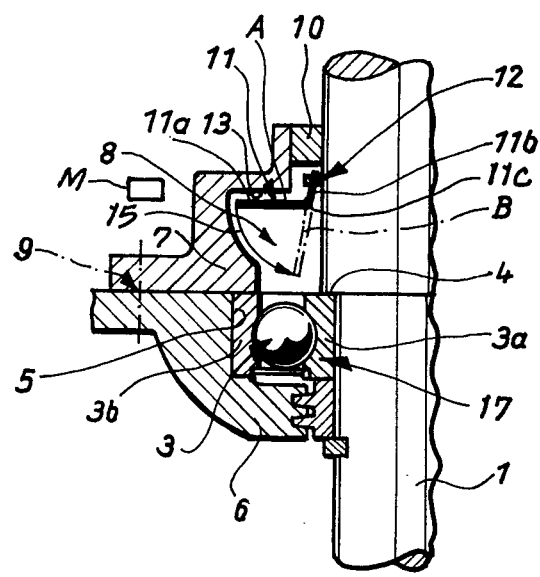

APPARATUS FOR LONG-TERM BEARING LUBRICATION

FIELD OF THE INVENTION

The invention relates to mechanisms to provide long-term lubrication for bearings that carry rotating shafts and the like. More particularly, the invention relates to the lubrication of roller and ball bearings used for example in electric motors, A.C. generators, and the like, with a grease reservoir that contains sufficient lubricant for providing bearing lubrication over an extended period of time.

BACKGROUND AND PRIOR ART

In mechanical machinery which includes relatively movable parts, it is desired that the lifetime of the various elements of the machine be limited substantially only by metal fatigue and not by wear and tear. In order to attain this long life, it is normally required to apply lubricant between relatively moving elements of the machine. The resupply of lubricant must occur at regular intervals in order to prevent any direct metal-to-metal contact which would cause rapid wear and tear. It is known in the art to increase the period of time between intervals of relubrication by providing a relatively large grease reservoir. However, it has been found that only a relatively small proportion of the lubricant in these grease reservoirs actually ever reaches the points of greatest friction, i.e., for example the bearing surfaces and the races of ball and roller bearings. Accordingly, the desired result is achieved only to a very limited degree. In many cases, the lubricant remains entirely within the reservoir and never reaches the bearing location. After a period of time, the lubricant hardens gradually and may even develop crustlike layers which contain abraded metal and other contaminants which further impede any movement of the lubricant in the direction of the bearing or to other locations where lubrication is required. Under those circumstances, the relatively moving parts receive no lubrication at all and make dry metal-to-metal contact leading to rapid deterioration. Furthermore, most lubricants tend to congeal at low temperatures making it very difficult for the lubricant to migrate from the reservoir to the intended point of lubrication.

It is also known in the art to provide positive relubrication by means of grease cups or with a grease injector system which is a very complicated mechanism. This type of relubrication requires constant supervision which is sometimes difficult to attain. Furthermore, it has been shown by actual tests that even though the grease reservoirs may contain sufficient lubricant, only very small amounts of grease are ever available at the points of intended lubrication so that very often the relatively moving parts run dry.

THE INVENTION

It is thus a principal object of the present invention to provide a mechanism for long-term lubrication of relatively moving mechanical parts in which lubricant is positively moved to the location of the relatively moving parts. It is an associated object of the invention to provide positive lubrication of relatively moving parts by continuous transport of lubricant from a grease reservoir even after some of the lubricant has been expended. Still another object of the invention is to provide continuous lubrication without operator attention.

According to the invention a lubricating mechanism especially for use with roller and ball bearings and the like is provided which includes a grease reservoir in which there is disposed a movable displacement element that can occupy at least two well-defined positions, one of which is a preparatory position in which the transport element extends into the lubricant and the second of which is a delivery position to which the transport element returns periodically, thereby displacing lubricant toward the intended location, i.e., the bearing surfaces.

It is a particular advantage of the apparatus of the invention to permit continued and positive lubrication even if only very small amounts of grease remain in the reservoir. In accordance with a preferred feature of the invention, a transport member is displaced by rotating motions of the shaft carried in the bearing.

If the transport member is moved by the rotating shaft, it is advantageously embodied as an elastic member which moves under the influence of centrifugal forces, thereby entering the mass of lubricant in the grease reservoir, the elasticity of the spring causing its return to its original position close to the shaft, thereby pressing lubricant toward the bearing. In another embodiment of the invention, the transport element may be subject to, for example, magnetic actuation.

The invention will now be described by way of a preferred exemplary embodiment with reference to the accompanying drawing.

THE DRAWING

The single FIGURE of the drawing is a schematic sectional illustration of the apparatus of the invention used in conjunction with a ball bearing carrying a rotating shaft.

DETAILED DESCRIPTION OF THE EXEMPLARY EMBODIMENT

The FIGURE is an axial section of a part of a bearing 3 carrying a shaft 1. In the embodiment shown, the bearing 3 is a ball bearing having an inner race 3a carried on a shoulder 4 of the shaft while the outer race 3b is pressed into a well 5 of an outer bearing element 6 which surrounds the shaft coaxially. Disposed between the races 3a, 3b are the bearing elements which, in this particular embodiment, are balls 17. It will be appreciated by the person skilled in the art that the apparatus, while illustrated for use with a ball bearing, is actually usable with any type of bearing including sleeve bearings, sintered bearing materials, bronze bearings, needle bearings, straight and tapered roller bearings, and the like. Associated with the bearing element 6 is a further stationary bearing element 7 within which is defined a space 8 that is intended to contain a supply of lubricant or grease. Preferably, the second bearing element 7 is cup-shaped and surrounds the shaft 1 concentrically. The parts 6 and 7 may be joined by any suitable means, for example by bolts 9. The bearing element 7 may be sealed with respect to the rotating shaft by a suitable seal 10, for example an oil ring or an O-ring. At the side of the reservoir 8 remote from the seal 10, the reservoir is limited by the presence of the bearing, in this case the ball bearing 3. It is a feature of the invention that the lubricant has generally free access from its position in the reservoir 8 to parts of the bearing 3.

It is a basic and principal feature of the present invention to provide within the reservoir 8 a movable transport element 11 which has at least a portion 11a that can undergo displacements within the space 8. The transport element may have a substantial area or may be an elongated strip. The motion of the element portion 11a within the grease reservoir takes place under the influence of at least one external variable which can assume at least two different states. Accordingly, the portion 11a of the transport element 11 also assumes two distinct positions within the grease reservoir 8, namely a preliminary position A shown in the figure by a solid line and indicating a migration of the portion 11a into the grease reservoir 8 to a substantial degree, at least as far as to have caused lubricant to come to lie between it and the bearing 3. A second distinct position assumed by the part 11a is a rest position B illustrated in dash-dotted lines. The position B is assumed by the member 11a when the external variable assumes its second state. The transition between the positions A and B may be made at a rate which depends on the change of the external variable but takes place in all cases. During this transition, the lubricant is displaced by the portion 11a in the direction of the bearing and, depending on the speed of transition, may be performed very rapidly.

In a preferred embodiment, the transport element is an elastic member, preferably a snap spring or the like, one of whose ends is attached to the rotating shaft at the point 12. In this case, the force which changes the position of the part 11a is the centrifugal force occurring when the shaft 1 rotates with respect to the bearing elements 6 and 7. The transport member 11, being attached to the rotating shaft, shares in its rotation so that its free end 11a is caused to move away from the shaft in the radial direction, thus essentially assuming the position A if the shaft rotation is sufficiently great.

If, as is preferably provided, the extent of the spring 11 is approximately the same as the radial extent of the grease reservoir 8, the part 11a will sweep virtually the entire extent of the space 8 and, in its position A, will have reached even the remote corner of the chamber 8. During its return to position B, it will be able to displace grease and sweep it in the direction of the bearing. The transition from the position A to the position B, see arrow 15, is preferably by a snap action which will occur when the external variable changes its state or becomes ineffective. In the present embodiment, this will occur when the centrifugal force vanishes, i.e., when the shaft stops or assumes rotational speeds which no longer suffice to provide sufficient force to cause substantial radial excursions of the element 11. In that case, the spring returns to its axial rest position at a rate dependent on the change in rotational speed of the shaft, preferably by snap action, and flings the lubricant into the bearing. This process is repeated whenever the shaft is stopped from previous rotation and, since the spring dimensions are so chosen that the position A is assumed under normal rotational speeds of the shaft, the part 11a of the transport element 11 reliably scrapes away even small amounts of lubricant from the far corners of the reservoir 8 and returns them in the direction of the bearing.

The spring element 11 preferably does not surround the shaft but has only limited angular extent so that only a portion of the lubricant in space 8 will be displaced upon return of spring element to the position B. Spring 11 has a snap or crease point 11c close to its attachment to the shaft 1, as clearly seen in the full-line representation in the figure to provide snap-over action between the radially extended position A and the essentially axially parallel position B. The amount of lubricant actually transported depends on a multitude of variables, for example the speed and deceleration of the shaft, the mass of the part 11a, etc. In order to increase the radial excursion, the part 11a may be provided with a special flyweight. Again, the element 11 may be shaped in special ways or may have structural elements that tend to transport lubricant during its motion.

The frequency of transport of grease toward the bearing depends on the number of times that the shaft is started and stopped. The element 11 may also be given a slight pitch so that it will transport lubricant during the rotation of the shaft.

The actuating force for the element 11, which, in the illustrated embodiment, is the centrifugal force due to the rotating shaft, may also be any other mechanical or non-mechanical force. For example, the transport element 11 may be moved by an external or internal magnetic field or by a suitable cam mechanism. The basic requirement is that the element 11 is movable between two different positions A and B whereby, during the transition between the two positions, the lubricant in the reservoir undergoes a displacement in the direction of the point of lubrication. If the element 11 is moved by a magnetic field, it need not be connected to the rotating shaft by its part 11b. The magnetic actuating field may be provided, for example, by the inherent magnetic members M of the machine, for example the stator windings of a motor.

Various changes and modifications may be made to the apparatus described in the exemplary embodiment, without thereby departing from the inventive concept and scope.

I claim:

1. An apparatus for long-term lubrication of a bearing (3) connecting a rotary shaft (1) and a stationary part (6), comprising:
    a housing (7) for holding said bearing and for defining a lubricant reservoir (8) to retain lubricant therein communicating with said bearing (3); and
    an elastic movable lubricant transport element (11), disposed within said reservoir and being capable of movement between at least a first, preparatory position (A) and a second, rest position (B), movement of said lubricant transport element between said first position (A) and said second position (B) being in a direction to move and transport lubricant by engagement of said transport element with lubricant in the reservoir from said reservoir (8) toward said bearing (3), said transport element being subjected to application of a moving force which depends on the rotation of the shaft.

2. An apparatus according to claim 1, wherein said transport element (11) includes a first part (11b) attached to and rotating with said shaft (1) and a second part (11a) which is displaced radially under the influence of centrifugal force and forming said moving force, upon rotation of the shaft.

3. An apparatus according to claim 2, wherein said transport element (11) is a snap spring which is bent radially outwardly due to the influence of centrifugal force to assume said first position (A), in which the second part (11a) is substantially in contact with an interior wall of said reservoir (8) and from which it returns by to said second position (B) when the shaft is stopped in which it is essentially parallel to the shaft (1).

4. Apparatus according to claim 3, wherein the bearing (3) is positioned axially staggered with respect to the point of attachment of the first part (11b) of the transport element (11) to the shaft, located directly adjacent the housing and open thereto to permit sweeping of lubricant within said housing directly to the bearing upon movement of said transport member between said positions.

5. Apparatus according to claim 3, wherein the snap spring (11) has a snap bend (11c) positioned adjacent the first part (11b) and is of limited arcuate extent.

6. Apparatus according to claim 3, wherein the external shape of said transport element (11) is matched to the internal shape of said reservoir (8); whereby, when the second part (11a) of said transport element (11) is fully extended and moves from the preparatory position (A) to the rest position (B), lubricant is swept from said reservoir (8) in the direction of said bearing; and wherein the snap spring (11) has a snap bend (11c) positioned adjacent the first part (11b) and is of limited arcuate extent.

7. An apparatus according to claim 2, wherein the external shape of said transport element (11) is matched to the internal shape of said reservoir (8); whereby, when the second part (11a) of said transport element (11) is fully extended and moves from the preparatory position (A) to the rest position (B), lubricant is swept from said reservoir (8) in the direction of said bearing.

8. An apparatus according to claim 1, wherein the moving force is centrifugal force to move said transport element (11) between said positions (A) and (B).

9. An apparatus according to claim 1, wherein the moving force is magnetic force to move said transport element (11) between said positions (A) and (B).

* * * * *